United States Patent
Gwinner et al.

(10) Patent No.: US 8,577,584 B2
(45) Date of Patent: Nov. 5, 2013

(54) METHOD FOR OPERATING AN INTERNAL COMBUSTION ENGINE

(75) Inventors: Robert Gwinner, Marbach (DE); Gholamabas Esteghlal, Stuttgart-Weilimdorf (DE)

(73) Assignee: Robert Bosch GmbH, Stuttgart (DE)

( * ) Notice: Subject to any disclaimer, the term of this patent is extended or adjusted under 35 U.S.C. 154(b) by 809 days.

(21) Appl. No.: 12/515,661

(22) PCT Filed: Dec. 20, 2007

(86) PCT No.: PCT/EP2007/064299
§ 371 (c)(1),
(2), (4) Date: Dec. 8, 2009

(87) PCT Pub. No.: WO2008/080870
PCT Pub. Date: Jul. 10, 2008

(65) Prior Publication Data
US 2010/0162996 A1  Jul. 1, 2010

(30) Foreign Application Priority Data
Dec. 27, 2006  (DE) .......................... 10 2006 061 561

(51) Int. Cl.
*F02D 11/10*  (2006.01)
*G06F 19/00*  (2011.01)

(52) U.S. Cl.
USPC ............ 701/114; 701/103; 701/110; 123/399

(58) Field of Classification Search
USPC ......... 123/351, 352, 359, 396, 399, 480–486, 123/490; 701/84, 110, 114, 193, 115; 73/114.15
See application file for complete search history.

(56) References Cited

U.S. PATENT DOCUMENTS

| | | | | |
|---|---|---|---|---|
| 5,983,859 | A * | 11/1999 | Bruedigam et al. | 123/396 |
| 6,223,721 | B1 * | 5/2001 | Bauer et al. | 123/399 |
| 6,440,038 | B1 * | 8/2002 | Holloway | 477/54 |
| 6,497,301 | B2 * | 12/2002 | Iida et al. | 180/249 |
| 6,507,780 | B2 * | 1/2003 | Graf | 701/51 |
| 6,578,546 | B2 * | 6/2003 | Schultalbers et al. | 123/300 |
| 6,964,192 | B2 | 11/2005 | Bauer et al. | |
| 6,973,914 | B2 * | 12/2005 | Wuest et al. | 123/396 |
| 7,027,908 | B2 | 4/2006 | Esteghlal | |

(Continued)

FOREIGN PATENT DOCUMENTS

| | | |
|---|---|---|
| DE | 19739564 | 3/1999 |
| DE | 10221341 | 11/2003 |
| WO | WO 03/018985 | 3/2003 |
| WO | WO 03/076785 | 9/2003 |

OTHER PUBLICATIONS

International Search Report, PCT International Patent Application No. PCT/EP2007/064299, dated Apr. 14, 2008.

*Primary Examiner* — Willis R Wolfe, Jr.
*Assistant Examiner* — Johnny Hoang
(74) *Attorney, Agent, or Firm* — Kenyon & Kenyon LLP

(57) ABSTRACT

A method for operating an internal combustion engine, in which a setpoint torque to be output by the internal combustion engine is restricted to a specifiable torque, in particular in response to an error in the control of the internal combustion engine. An engine speed of the internal combustion engine is determined as a function of at least one performance quantity of the internal combustion engine, and the specifiable torque is modified as a function of the determined engine speed.

19 Claims, 3 Drawing Sheets

(56) References Cited

U.S. PATENT DOCUMENTS

| | | | |
|---|---|---|---|
| 7,124,012 B2 * | 10/2006 | Feder et al. | 701/101 |
| 7,204,229 B2 * | 4/2007 | Ortiz | 123/339.14 |
| 2002/0179041 A1 * | 12/2002 | Schultalbers et al. | 123/299 |
| 2003/0212483 A1 | 11/2003 | Folke | |
| 2003/0213465 A1 * | 11/2003 | Fehl et al. | 123/352 |
| 2004/0011328 A1 * | 1/2004 | Sans | 123/342 |
| 2004/0210374 A1 * | 10/2004 | Werner et al. | 701/67 |
| 2005/0033558 A1 * | 2/2005 | Schwertfuehrer | 702/188 |
| 2005/0062449 A1 * | 3/2005 | Wang et al. | 318/366 |
| 2008/0262697 A1 * | 10/2008 | Gangi et al. | 701/103 |
| 2009/0099703 A1 * | 4/2009 | Rehm et al. | 700/293 |
| 2009/0164107 A1 * | 6/2009 | Boumans et al. | 701/114 |
| 2009/0319149 A1 * | 12/2009 | Rehm et al. | 701/99 |
| 2009/0320793 A1 * | 12/2009 | Pitzal et al. | 123/436 |
| 2010/0217463 A1 * | 8/2010 | Fuchs et al. | 701/22 |

\* cited by examiner

METHOD FOR OPERATING AN INTERNAL COMBUSTION ENGINE

FIELD OF THE INVENTION

The present invention relates to a method and a control device for operating an internal combustion engine, in which a setpoint torque to be output by the internal combustion engine is restricted to a specifiable torque, in particular in response to an error in the control of the internal combustion engine.

BACKGROUND INFORMATION

Methods of the type mentioned above and used, for instance, within the framework of monitoring a torque actually output by the internal combustion engine. A restriction of the setpoint torque to be output by the internal combustion engine is provided especially when an error has been detected in the control of the internal combustion engine, which error causes an undesired increase in the torque output by the internal combustion engine.

SUMMARY

An object of the present invention to provide an improved method for operating an internal combustion engine.

According to the present invention, this object may be achieved by determining an engine speed of the internal combustion engine as a function of at least one performance quantity of the internal combustion engine, and by modifying the specifiable torque as a function of the determined engine speed.

By modifying the specifiable torque provided for the restriction as a function of the determined engine speed according to the present invention, it is advantageously ensured that, in addition to the pure torque restriction of conventional systems, the operation of the internal combustion engine is implemented by additionally taking the engine speed into account; in this way it possible, for example, to avoid undesirably high engine speeds of the internal combustion engine during the torque restriction, which is not possible in the conventional torque restriction which is independent of the engine speed.

Accordingly, the determined engine speed may advantageously constitute a maximally allowed engine speed for the operation, whose exceeding the present invention prevents by modifying the specifiable torque provided for the restriction.

An especially universal use of the method according to the present invention is possible if the maximally allowed engine speed is obtained by way of a maximum selection from a plurality of competing engine speed demands of other systems. This ensures that systems that are important for the driving operation such as, for example, a gearshift control of a transmission assigned to the internal combustion engine, are able to operate properly even while the torque is restricted.

In an especially advantageous manner, in the method according to the present invention it is possible to specify the maximally allowed engine speed of the internal combustion engine as a function of a signal from an accelerator sensor.

Specifying a maximally allowed engine speed as a function of an accelerator sensor signal according to the present invention, and correspondingly modifying the specifiable torque as a function thereof, may advantageously ensure that a restriction of the engine speed of the internal combustion engine as a function of the torque requested by the driver is able to be implemented simultaneously, regardless of the restriction of the setpoint torque to be output by the internal combustion engine specified by an engine control. In particular, this avoids the problem of the internal combustion engine assuming a relatively high engine speed in response to a brief actuation of the accelerator during a torque restriction of the internal combustion engine, which—despite the subsequent release of the accelerator—remains undesirably unchanged because of an inactive idling-speed controller, until consumer losses caused by an air-condition system or power steering, for instance, have reduced a needlessly high, pilot-controlled torque again. In conventional operating methods, the excessively high precontrolled torque usually results because of limited options in the modeling precision of the systems of the internal combustion engine. The safety offsets etc., which are meant to prevent an erroneous response of a torque monitor caused by measuring errors in the acquisition of performance quantities of the internal combustion engine etc., are also selected according to this modeling precision.

In some operating modes of the internal combustion engine, a slight increase in the actual torque output by the internal combustion engine already results in a disproportionately high increase in the actual engine speed of the internal combustion engine, which has a negative effect on the emission values of the internal combustion engine. In such operating states there is no allowed restriction of the engine speed of the internal combustion engine, in particular also by the afore-described restriction of the setpoint torque.

The example method according to the present invention ensures a reliable restriction of the maximum engine speed of the internal combustion in such operating modes as well.

An especially flexible adaptation of the maximally allowed engine speed for the internal combustion engine to a driver request represented by the accelerator sensor signal is able to be achieved when using a preferably non-linear characteristic curve for determining the maximum engine speed as a function of the accelerator sensor signal.

According to one specific example embodiment of the present invention, an especially simple consideration of the maximally allowed engine speed of the present invention is achieved by forming a maximum torque that corresponds to the maximum engine speed, and forwarding it to a torque coordinator of the internal combustion engine for modification of the specifiable torque; if required, it is prioritized there with additional torque demands of the internal combustion engine or associated systems in a manner known to one skilled in the art. That is to say, in addition to the torque restriction in case of a fault as in the conventional operating methods, a torque that is derived from the maximally allowed engine speed according to the present invention is used to realize the engine speed restriction that forms the basis of the example embodiment of the present invention. A corresponding prioritization may advantageously include a minimum selection, for example, which selects the maximum torque corresponding to the maximally allowed engine speed for the restriction if it is smaller than the specifiable torque also formed in conventional methods, which corresponds to a restriction of the specifiable torque to the maximum torque. As an alternative, the conventionally formed specifiable torque may also be reduced by a value that is a function of the maximum torque.

To activate the specification of the maximally allowed engine speed of the present invention only in an operating range of interest of the internal combustion engine, the present invention makes it possible to specify, instead of the maximally allowed engine speed determined as a function of the accelerator sensor signal, a specifiable additional permitted maximum engine speed that is independent of the accelerator sensor signal, in particular, if the permitted maximum engine speed, determined as a function of the accelerator sensor signal, is greater than an instantaneous engine speed of the internal combustion engine, preferably reduced by a specifiable offset value. The consideration of an actual engine speed reduced by the specifiable offset value advantageously allows the realization of a hysteresis behavior, which suppresses oscillations in a control structure implementing the example method according to the present invention.

To obtain a reliable and rapid restriction of the engine speed of the internal combustion engine even with a vanishing driver wish, in those cases where the accelerator sensor signal undershoots a specifiable threshold value or vanishes entirely, the specifiable torque is modified by a torque value that is determined as a function of an instantaneous engine speed of the internal combustion engine and/or a setpoint engine speed of the internal combustion engine that preferably corresponds to the setpoint torque. The torque value provided according to the present invention may advantageously also be taken into account when a safety offset is added to the torque provided for the restriction.

Of special importance is the realization of the method according to the present invention in the form of a computer program storable on an electronic storage medium, which is assigned to a control device of the internal combustion engine, for instance.

Additional features, application options and advantages of the present invention ensue from the following description of exemplary embodiments of the present invention, which are illustrated in the figures. All of the described or illustrated features form the subject matter of the present invention, individually or in any combination, regardless of their combination or their antecedent reference, and also regardless of their formulation or illustration in the description or in the figures.

DETAILED DESCRIPTION OF EXAMPLE EMBODIMENTS

Figure 1:
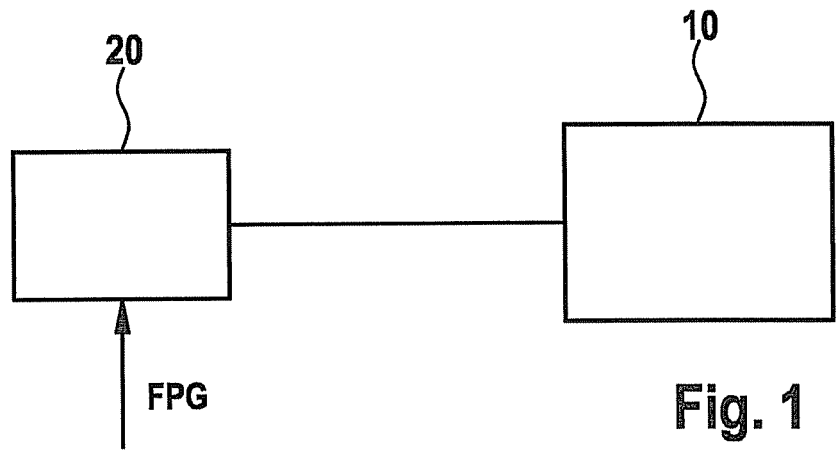
FIG. 1 shows a schematic block diagram of an internal combustion engine, in which an example method according to the present invention is used.

FIG. 1 schematically illustrates an internal combustion engine 10 whose operation is controlled and/or regulated with the aid of an associated control device 20.

As can be seen from FIG. 1, a signal FPG of an accelerator sensor is forwarded to control device 20, the signal representing a torque desired by a driver of the motor vehicle in which internal combustion engine 10 is installed.

The example method according to the present invention provides a restriction of the setpoint torque to be output by internal combustion engine 10 to a specifiable torque, in particular in response to an error in the control of internal combustion engine 10, in order to prevent an undesired acceleration of internal combustion engine 10 as a result of torque-increasing errors in the control or control device 20.

Figure 2B:
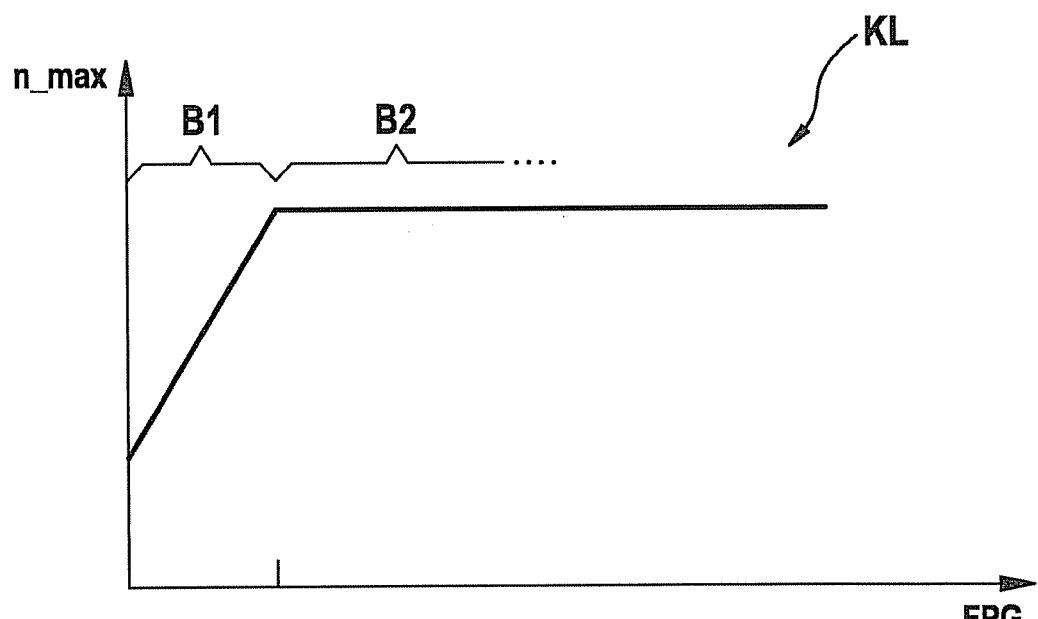
FIG. 2b shows a characteristic curve to be used with the example method illustrated with the aid of the flow chart from FIG. 2.
Figure 2A:
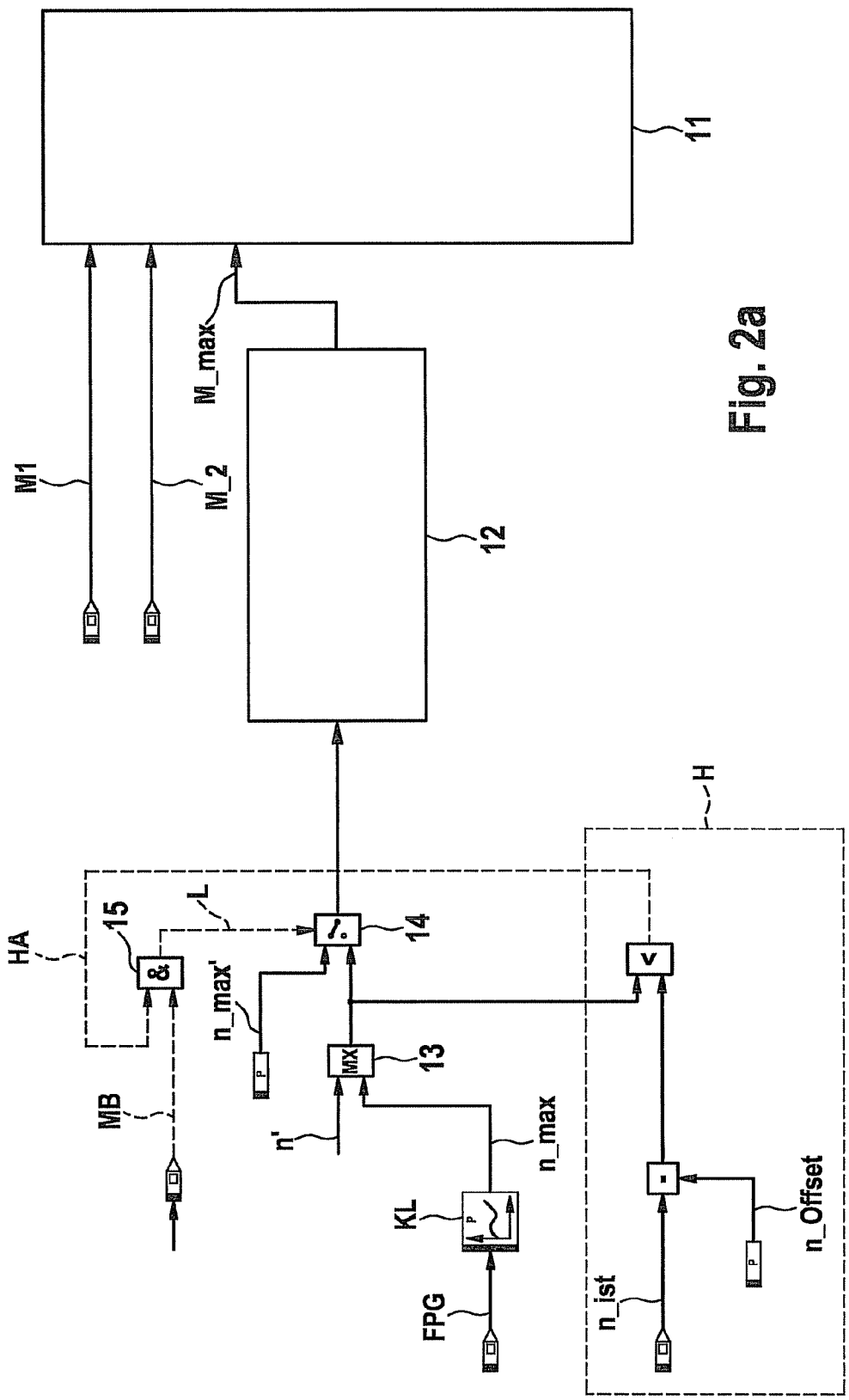
FIG. 2a shows a flow chart of a first specific embodiment of the example method according to the present invention.

FIG. 2a shows a flow chart for realizing a first specific embodiment of the example method according to the present invention, in which a setpoint torque correspondingly restricted to specifiable torque M1 is forwarded to a torque coordinator 11 known to one skilled in the art, which implements a priorization of specifiable torque M1 with additional torques M2, M_max with which it is supplied.

Additional torque M2 is, for example, a torque requested by additional systems (not shown) of internal combustion engine 10.

According to the example embodiment of the present invention, torque M_max also supplied to torque coordinator 11 is formed as a function of an engine speed n_max maximally allowable for internal combustion engine 10, which is specified as a function of accelerator sensor signal FPG according to the present invention (see also FIG. 1).

As can be seen in FIG. 2a, accelerator sensor signal FPG is forwarded to a function block KL for realizing a preferably non-linear characteristic curve, which transforms accelerator sensor signal FPG into corresponding maximally allowed engine speed n_max.

FIG. 2b shows such a characteristic curve KL by way of example, which has a first, linear region B1 as well as an additional, non-linear region B2, which provides a restriction of maximum engine speed n_max to a constant value.

An allowed maximum engine speed n_max for internal combustion engine 10 determined in this manner is supplied to function block 12, which forms a maximum torque M_max corresponding to maximally permitted engine speed n_max therefrom and forwards it to torque coordinator 11.

In addition to maximum engine speed n_max determined with the aid of characteristic curve KL according to the present invention, torque requests n' of other systems are advantageously taken into account as well in that they, together with permitted maximum engine speed n_max, are forwarded to a maximum selection implemented by function block 13. This means that the largest value supplied to functional block 13 on the input side is available at the output of function block 13. If necessary, this makes it is possible, for example, to give preference to torque requests n' originating from a gear control (not shown) instead of the maximally permitted engine speed n_max formed by accelerator sensor signal FPG.

A switch 14 is post-connected to maximum selection 13, which, depending on the logic signal L it receives, forwards to function block 12 either the engine speed value obtained from maximum selection 13, or a further value n_max' for the maximum engine speed of internal combustion engine 10.

Additional engine speed value n_max' preferably is a maximally allowed additional engine speed that is independent of accelerator sensor signal FPG, in particular, such as a fixedly specified engine speed as it is also specified for a normal operation of internal combustion engine 10, for instance.

The value of logic signal L controlling switch 14 depends, for one, on a logic signal MB indicating the torque restriction and, for another, on an output signal HA of a hysteresis branch H. As can be gathered from FIG. 2a, logic signals MB, HA are linked to one another by AND element 15 in order to obtain logic signal L, which controls switch 14.

Hysteresis branch H provides a comparison of the engine speed value obtained from maximum selection 13 with the instantaneous engine speed n_actual of internal combustion engine 10 reduced by an offset value n_offset, and outputs an output signal HA having the value of logical one whenever the engine speed value determined via maximum selection 13 is smaller than actual engine speed n_actual of internal combustion engine 10 reduced by offset value n_offset. In other words, in this case and if torque restriction MB is activated simultaneously, the signal obtained from maximum selection 13 is forwarded to function block 12. If maximum engine speed n_max determined from accelerator sensor signal FPG according to the present invention is greater than the additional engine speed values n' forwarded to maximum selection 13, then maximally allowed engine speed n_max determined according to the present invention is used in function block 12 to form limiting torque M_max, which is a function of accelerator sensor signal FPG. This ensures that internal combustion engine 10 does not assume an unintentionally high engine speed, which may come about due to tolerances, the restriction by specifiable torque M1 notwithstanding. Instead, via the afore-described mechanism, an advantageous restriction of the torque output by internal combustion engine 10 takes place according to the example embodiment of the present invention, by limiting torque M_max, which is a direct function of maximally allowed engine speed n_max and, correspondingly, of accelerator sensor signal FPG as well.

With a non-vanishing driver wish, i.e., an accelerator sensor signal FPG that is greater than zero and as a result of the inactive idling-speed controller in such a case, the engine speed of internal combustion engine 10 in conventional systems could rise to disproportionately high values in torque restriction MB, despite the restriction by specifiable torque M1, which values are accompanied by correspondingly disadvantageous emission values. In conventional systems such a high engine speed of internal combustion engine 10 would be reduced only very slowly because of the inactive idling speed control, for instance by consumer losses caused by an air-conditioning system or a power steering system or the like.

The example method according to the present invention advantageously circumvents this undesired increase in engine speed in that a current value of an accelerator sensor signal is taken into account when forming limiting torque M_max.

As already described, torque coordinator 11 implements a priorization of torque values M1, M_2, M_max it has received, and generates corresponding control variables for internal combustion engine 10 as a function of a torque value actually to be implemented, which control variables may be, for example, the input of an ignition angle and/or a fuel quantity to be injected and/or a control value for a throttle valve of internal combustion engine 10. Furthermore, torque coordinator 11 may implement a separate priorization for an air path and a fuel path of internal combustion engine 10, or for corresponding lead and/or actuating torques. The torque actually to be implemented may be determined by a minimum selection between torque values M1, M_max, for example, so that, in case of M_max<M1, the torque corresponding to allowed maximum engine speed n_max is advantageously set instead of, for example, higher torque M1, which is generated in the conventional manner and bears no relation to the driver wish. Instead of the minimum selection, the torque actually to be implemented may also be obtained by suitably modifying torque M1 as a function of maximum torque M_max. In particular, such a modification may include a reduction of torque M1 by a value which is a function of maximum torque M_max.

Figure 3:
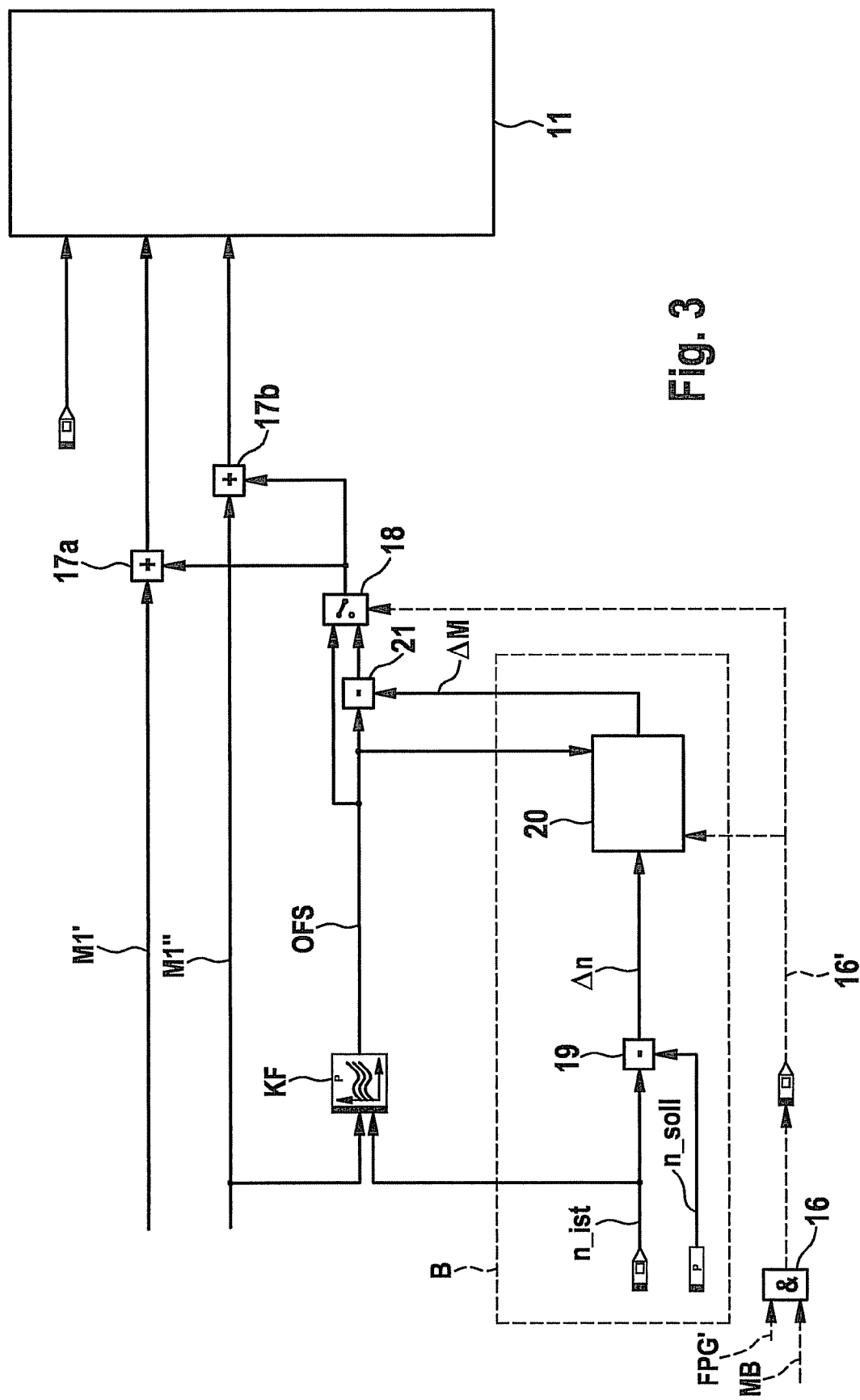
FIG. 3 shows a flow chart of an additional specific example embodiment of the method according to the present invention.

FIG. 3 shows a flow chart of a further specific embodiment of the present invention, in which torque coordinator 11 receives two values M1', M1" for a specifiable torque for limiting purposes, of which first torque value M1' corresponds to a specifiable lead torque, and second torque value M1" corresponds to a specifiable actuating torque value.

The method variant according to the present invention, which corresponds to the flow chart of FIG. 3, is preferably implemented when a value of accelerator sensor signal FPG drops below a specifiable threshold value or assumes the value of zero, thereby indicating the absence of a driver wish with regard to a torque to be output by internal combustion engine 10. In the flow chart from FIG. 3, the correspondingly vanishing accelerator sensor signal value is indicated by logic signal FPG, which, together with logic signal MB indicating the torque restriction, is forwarded to an AND element 16. Output signal 16' of AND element 16 thus indicates that no driver wish is present, i.e., the driver has not operated the driving pedal, i.e., the accelerator, and that torque restriction MB is active, which occurs in response to a fault detected in the engine control, for example.

In such a case the example method of the present invention advantageously provides that the function components combined in block B modify the torque values M1', M" to be used for the torque restriction in the manner described in the following text.

Usually a so-called safety offset OFS is determined for each torque value M1', M1" as a function of different performance variables of internal combustion engine 10, using characteristics map KF; this safety offset is added to torque values M1', M1" via adders 17a, 17b, in order to compensate for inaccuracies that arise in the torque monitoring and are the result of measuring errors and the like, for example, or in order to introduce a specifiable tolerance in the torque monitoring.

This safety offset OFS is modified with the aid of function block B provided according to the present invention, in order to bring about the afore-described modification of torque values M1', M1".

The modification of these torque values according to the present invention is activated or deactivated via switch 18 and takes place only if output signal 16' of AND element 16 has the value of logical one, i.e., when no driver wish exists and torque restriction MB is active. In all other cases, safety offset signal OFS formed in the conventional manner from characteristics map KF is directly forwarded to adders 17a, 17b by switch 18.

To influence torque values M1', M1" according to the example embodiment of the present invention, a difference Δn_actual is first formed from actual engine speed n_actual and a setpoint engine speed n_setpoint specified for the monitored operating state. For example, setpoint engine speed n_setpoint may be a setpoint engine speed provided for idling operation of internal combustion engine 10, since no driver wish exists in the present instance, cf. signal FPG'. Engine speed difference Δn generated by subtraction element 19 is forwarded to an integrator 20, which generates a corresponding memory value over the time, which corresponds to the time integral of engine speed difference Δn between actual engine speed n_actual and setpoint engine speed n_setpoint for internal combustion engine 10. According to the present invention, a torque value ΔM obtained at the output of integrator 20 as a function of its memory value is forwarded to additional subtraction element 21, so that offset value OFS obtained with the aid of characteristics map KF is reduced accordingly by value ΔM, before it is added via adders 17a, 17b to torque values M1', M1" resulting from the torque restriction.

The afore-described example method according to the present invention thus may ensure that the engine speed of internal combustion engine 10 is reliably regulated to specified setpoint engine speed n_setpoint even in the presence of a vanishing driver wish; this is accomplished by adjusting offset value OFS provided for torque values M1', M1" in the conventional manner by a value ΔM according to the present invention, which value corresponds to an integrated difference between actual engine speed n_actual and setpoint engine speed n_setpoint for internal combustion engine 10. That is to say, the offset value actually added to torque values M1', M1" is adapted as a function of a system deviation for the engine speed of the internal combustion engine. A relatively high engine speed difference Δn, for instance, results in a relatively high torque value ΔM, which causes a correspondingly strong reduction of safety offset OFS, thereby effectively realizing a greater torque restriction, which has the advantageous effect of reducing the torque.

If engine speed difference Δn is relatively small, then value ΔM will cause only a relatively small corresponding change in the safety offset OFS.

Modifying safety offset OFS as a function of engine speed difference Δn has the advantage that—starting from an undesirably high engine speed of the internal combustion engine—an effective reduction of the engine speed of the internal combustion engine is directly realizable by a limiting torque supplied to torque coordinator 11, rather than by a separate engine speed regulator, which would bring about a much slower adjustment of the engine speed of internal combustion engine 10.

Over all, the use of the example method according to the present invention increases the comfort during the operation of the internal combustion engine because disproportionately high engine speeds are effectively and rapidly reduced to a specifiable rotational setpoint speed. Furthermore, in the idling speed range, the emissions output by internal combustion engine 10 will be reduced.

The invention claimed is:

1. A method for operating an internal combustion engine, comprising:
    restricting a setpoint torque to be output by the internal combustion engine to a specifiable torque in response to an error in a control of the internal combustion engine;
    determining a maximally allowed engine speed of the internal combustion engine as a function of a signal of an accelerator sensor; and
    modifying the specifiable torque as a function of the determined engine speed.

2. The method as recited in claim 1, wherein the maximally allowed engine speed is obtained by way of a maximum selection from a plurality of competing engine-speed demands from other systems.

3. The method as recited in claim 1, wherein the maximally allowed engine speed is obtained as a function of a control of a gear train assigned to the internal combustion engine.

4. The method as recited in claim 1, wherein the specifiable torque is modified by a torque value when the accelerator sensor signal undershoots a specifiable threshold value or vanishes, the torque value being determined as a function of at least one of an actual engine speed of the internal combustion engine, and a setpoint engine speed of the internal combustion engine.

5. The method as recited in claim 4, wherein the setpoint engine speed corresponds to the setpoint torque.

6. The method as recited in claim 1, wherein a maximum torque corresponding to the maximally allowed engine speed is formed and forwarded to a torque coordinator of the internal combustion engine to modify the specifiable torque.

7. The method as recited in claim 6, wherein the specifiable torque is restricted to the maximum torque.

8. A control device for an internal combustion engine, comprising:
    a control arrangement adapted to restrict a setpoint torque to be output by the internal combustion engine to a specifiable torque in response to an error in a control of the internal combustion engine and adapted to determine a maximally allowed engine speed of the internal combustion engine as a function of a signal of an accelerator sensor and to modify the setpoint torque as a function of the determined engine speed.

9. The control device as recited in claim 8, wherein the maximally allowed engine speed is obtained by way of a maximum selection from a plurality of competing engine-speed demands from other systems.

10. The control device as recited in claim 8, wherein the maximally allowed engine speed is obtained as a function of a control of a gear train assigned to the internal combustion engine.

11. The control device as recited in claim 8, wherein the specifiable torque is modified by a torque value when the accelerator sensor signal undershoots a specifiable threshold value or vanishes, the torque value being determined as a function of at least one of an actual engine speed of the internal combustion engine, and a setpoint engine speed of the internal combustion engine.

12. The control device as recited in claim 11, wherein the setpoint engine speed corresponds to the setpoint torque.

13. The control device as recited in claim 8, wherein a maximum torque corresponding to the maximally allowed engine speed is formed and forwarded to a torque coordinator of the internal combustion engine to modify the specifiable torque.

14. The control device as recited in claim 8, wherein the maximally allowed engine speed is obtained by way of a maximum selection from a plurality of competing engine-speed demands from other systems, and wherein the specifiable torque is modified by a torque value when the accelerator sensor signal undershoots a specifiable threshold value or vanishes, the torque value being determined as a function of at least one of an actual engine speed of the internal combustion engine, and a setpoint engine speed of the internal combustion engine.

15. The control device as recited in claim 14, wherein the setpoint engine speed corresponds to the setpoint torque.

16. The control device as recited in claim 14, wherein a maximum torque corresponding to the maximally allowed engine speed is formed and forwarded to a torque coordinator of the internal combustion engine to modify the specifiable torque.

17. The control device as recited in claim 8, wherein the maximally allowed engine speed is obtained as a function of a control of a gear train assigned to the internal combustion engine, and wherein the specifiable torque is modified by a torque value when the accelerator sensor signal undershoots a specifiable threshold value or vanishes, the torque value being determined as a function of at least one of an actual engine speed of the internal combustion engine, and a setpoint engine speed of the internal combustion engine.

18. The control device as recited in claim 17, wherein the setpoint engine speed corresponds to the setpoint torque.

19. The control device as recited in claim 17, wherein a maximum torque corresponding to the maximally allowed engine speed is formed and forwarded to a torque coordinator of the internal combustion engine to modify the specifiable torque.

* * * * *

UNITED STATES PATENT AND TRADEMARK OFFICE
CERTIFICATE OF CORRECTION

PATENT NO.       : 8,577,584 B2                                                Page 1 of 1
APPLICATION NO.  : 12/515661
DATED            : November 5, 2013
INVENTOR(S)      : Gwinner et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 972 days.

Signed and Sealed this
Twenty-second Day of September, 2015

Michelle K. Lee
*Director of the United States Patent and Trademark Office*